United States Patent Office 2,892,718
Patented June 30, 1959

2,892,718
TREATMENT OF MALT BEVERAGES

Irwin M. Stone, Eastchester, N.Y., assignor to Baxter Laboratories, Inc., a corporation of Delaware No Drawing. Application May 13, 1957
Serial No. 658,488

16 Claims. (Cl. 99—48)

This invention relates to a process for the stabilization of malt beverages against the effects of oxygen and oxidation and to the compositions used therein. This application is a continuation-in-part of my application, Serial No. 181,116, filed August 23, 1950.

It is well known in the brewing industry that gradual but deleterious changes take place in the appearance, clarity and organoleptic properties of malt beverages, even during tank storage and especially during the shelf life of the packaged goods.

To a large extent, these changes are caused by oxidation reactions as influenced by the factors of air content, time and temperature of storage, presence of metal and other catalysts, and the inherent properties of the beer or ale resulting from the conditions of preparation and storage. The dissolved air, the ambient air, and the air remaining in the head space of the container, as well as the oxidation-reduction potential of the malt beverages, directly or indirectly modify the stability, color, taste and clarity.

The prior art contains suggestions which attempt to remedy this situation. The addition of sulfites has not provided a solution to the problem. The excessive amount of sulfite necessary to modify the stability appreciably, has been found to impart an off-taste to the beer, thus restricting its commercial use.

Two significant patents relating to the preservation of the innate properties of beers and ales have been granted. U.S. Patent No. 2,159,985 relates to the treatment of beers and ales with ascorbic acid and other ene-diol compounds to effect a lowering of the oxidation-reduction potential of the malt beverages to achieve stabilization. The second patent, No. 2,206,066, teaches the addition of alkali metal salts of hydrosulphurous acid to stabilize malt beverages against deterioration or alterations caused by oxidation and storage.

It has been found that these two treatments function in different manners. When sodium hydrosulfite, for example, is added to beer, it reacts rapidly and almost immediately with and completely removes the dissolved oxygen present. The extent of lowering of the oxidation-reduction potential of the system depends upon the excess of sodium hydrosulfite over and above the quantitative amount required to react with the dissolved oxygen.

Sodium hydrosulfite is notably unstable in aqueous solutions, especially where the pH is below 7. Decomposition in beer, where the pH is between 4.0 to 4.5, takes place in a very short period of time; thus, the sodium hydrosulfite becomes totally ineffective and unavailable for removing further amounts of oxygen or for depressing the oxidation-reduction potential. Its high reducing power is thereby also destroyed. Sodium hydrosulfite is an ideal agent for treating beer in the storage tanks for the immediate removal of the dissolved oxygen contained in the beer at the time the hydrosulfite is added. However, none remains undecomposed to remove the oxygen of the air introduced in subsequent processing steps or that entering the head space during filling of the containers.

In contrast to sodium hydrosulfite, small amounts of ascorbic acid or its related ene-diol homologs or equivalents depress the oxidation-reduction potential very considerably without rapidly removing the dissolved oxygen of the medium. Approximately only one-tenth as much by weight of ascorbic acid as sodium hydrosulfite is required to attain the same oxidation-reduction potential level. The marked lowering of the oxidation-reduction potential, per se, seems to prevent or retard the oxidation or other changes of the normal beer constituents that tend to form hazes or produce off flavors. This is true even while considerable molecular oxygen remains in the system.

One of the objections to the use of the hydrosulfite treatment is that noticeable off-tastes are developed and the natural flavors are masked when amounts are added in excess of about 10 to 15 mg. per 12 ounces (28–42 p.p.m.). No such practical limitation exists for the use of ascorbic acid. This material, in beer, is bland, and does not introduce or develop off-flavors even when used in fairly large excess over the minimum requirement.

Another and even more serious objection to the use of sodium hydrosulfite for the treatment of beer lies in its inherent instability in solution. When sodium hydrosulfite is dissolved in water or in beer, it tends to undergo a non-oxidative decomposition, giving off sulfur dioxide and hydrogen sulfide gases and throwing down a precipitate of colloidal sulfur. By non-oxidative decomposition, it is meant a chemical alteration of the structure of hydrosulfite molecules taking place in the absence of molecular oxygen to distinguish it from the oxidative reaction of hydrosulfite with oxygen. An end product of this non-oxidative decomposition is sodium sulfite which has none of the required properties of the hydrosulfite ion. The sulfite ion does not function to rapidly absorb dissolved oxygen and is inoperative for the purpose of this invention. The rate at which this non-oxidative decomposition proceeds is dependent on the concentration of the solution and the pH. At the pH of beer, the decomposition is quite rapid and the intrinsic activity of the solutions are lost.

Any treatment added to beer has to be added in solution. This is required because beer, being a labile carbonatetd liquid, will not tolerate the addition of dry materials without gas evolution. If it were possible to overcome the mechanical difficulties of adding a dry powder to beer, any dry material so added would disturb the gas system and liberate large quantities of bubbles which would cause foaming, making it impossible to pump the beer or fill the tanks. Any additive, therefore, is first dissolved in water or beer, which solution is then pumped into the beer lines under pressure and the amounts are usually controlled by means of a proportioning device. This is the customary means of adding the chillproofing enzymes universally used in the brewing industry. As a practical matter, there may be a considerable time lapse between the preparation of the solution and its complete addition to the beer.

Sodium hydrosulfite dissolved in water and especially in beer rapidly undergoes a non-oxidative decomposition in which it loses its ability to rapidly absorb molecular oxygen and the noxious gases, sulfur dioxide and hydrogen sulfide, are given off and a precipitate of colloidal sulfur is formed. In commercial brewery operations, therefore in view of the many hours that may elapse between the time of the preparation of the additive solution and its complete addition to beer, the hydrosulfite solution may decompose and lose its ability to carry out its function of absorbing dissolved oxygen. In addition, if any hydrogen sulfide gas is liberated during its decomposition, this gas, even if only present in the merest traces, will render the beer unpalatable. Hydrogen sulfide, if present in beer in amounts in excess of five parts per billion of beer, contributes to off-flavors. Further, if colloidal sulfur is formed during the decomposition of hydrosulfite solutions, then the beer will become hazy and unsalable. This type of haze is practically impossible to filter out of the beer.

I have found that when solutions are prepared containing both sodium hydrosulfite and a salt of an ascorbic acid, the non-oxidative decomposition of the hydrosulfite ion above described is retarded and prevented. Solutions of hydrosulfite and an ascorbate are stable and no longer give off hydrogen sulfide nor do they precipitate colloidal sulfur. This not only happens in water solutions, but also in beer having a pH in the range of 4.0 to 4.5 at which the hydrosulfite ion is normally very unstable.

The following experiment illustrates this stabilization of the hydrosulfite ion by the ascorbate radical:

Two aqueous solutions of sodium hydrosulfite are prepared. One solution contains 0.4% sodium hydrosulfite by itself and other contains 0.4% sodium hydrosulfite plus 0.5% sodium ascorbate. In about five minutes standing, the solution of sodium hydrosulfite, by itself, starts to become hazy. In about a half hour, the sodium hydrosulfite solution has become very hazy (milky) while the solution containing the mixture of hydrosulfite and ascorbate is still clear. Titration of the hydrosulfite ion with standard indigo disulfonate solution shows that the hydrosulfite ion has been completely destroyed in the solution containing hydrosulfite alone after standing one-half hour whereas the solution containing the mixture of hydrosulfite with ascorbate has the same activity as it had when originally prepared. Keeping these solutions in a closed container out of contact with air for periods up to 72 hours shows that the hydrosulfite activity in a solution containing hydrosulfite by itself, is completely lost whereas, in the solution conaining the mixture of hydrosulfite and ascorbate, two-thirds of the original activity still remains.

This stabilization of the hydrosulfite in solution by the ascorbate compounds is of vital importance in the practice of this invention. It makes possible the practical usage of the hydrosulfite treatment without the risk of spoiling the beer by off-odor due to traces of hydrogen sulfide or from sulfur hazes interfering with the clarity and appearance of the beer.

The mode of action of the combined treatment or mixture when added to storage beer appears to be that outlined in the following. The sodium hydrosulfite effects an immediate removal of the dissolved oxygen contained in solution in the beer. The ascorbate produces lowering of the oxidation-reduction potential and tends to stabilize the unreacted excess of sodium hydrosulfite against decomposition. The ascorbate also is available to take care of any further oxidation or catalytic alterations affecting the system such as when more oxygen enters the beer during transfer from tank to tank, during further processing, and filtering. The ascorbate is present to protect against head-space air which enters during bottling and reacts with the beer during the high temperature of pasteurization and the long period of storage in the container prior to consumption.

The ascorbate compounds found suitable for the practice of this invention comprise the alkali or alkaline earth salts of the different ascorbic acid analogues. This includes sodium, potassium or calcium ion as the cation and any of the series of ascorbic acids of varying spacial configuration and carbon chain length as the anion.

The anion would comprise oxytetronic acid as the lowest member of this group having four carbons:

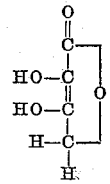

to ascorbic acids of increasing carbon chain length of 5, 6, 7 or even more carbons. The preferred ascorbates and those which I have used to the greatest extent, are derived from l-ascorbic acid and isoascorbic acid of 6-carbon length as follows:

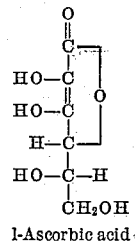 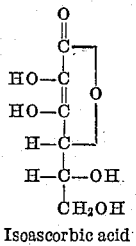

l-Ascorbic acid        Isoascorbic acid

All these ascorbic compounds are characterized by the presence of the ene-diol group—

which imparts strong reducing properties to the molecule enabling it to effect a very substantial lowering of the oxidation-reduction potential of solutions containing only small quantities.

Likewise it is to be understood that the invention is not limited to the use of sodium hydrosulfite. Other salts of hydrosulphurous acid, particularly other alkali metal salts, such as potassium hydrosulphite, may be used. It is also understood that the term hydrosulphurous acid represents the compound which, in some literature references, has been termed hyposulphurous acid.

The ratio of sodium hydrosulfite to ascorbic acid is very flexible and in part depends upon the end results desired. For those commercial operations wherein abnormally high amounts of air are inadvertently introduced into the beer prior to or during storage, filtration, and bottling, a high ratio of hydrosulfite to ascorbic acid is indicated. The converse is true for low levels of dissolved oxygen. Where processing operations are controlled and bottling is performed with a minimum introduction of oxygen into the head space of the container, low ratios of hydosulfite to ascorbate ions may be used. Other factors influence this ratio such as the characteristics of the beer, expected shelf life before consumption, cost of the ascorbic salt and influence upon taste.

Although very small amounts of either compound may be used in conjunction with relatively large amounts of the other, I have found the percentage of sodium hydrosulfite in the mixture to range from approximately 5% to 90% as broadly suitable for normal industrial uses. The optimum range is about 15% to 45% of sodium hydrosulfite in the mixtures. The total amount of both compounds generally need not exceed about 250 parts per million of beer.

It is known that the so-called gushing of beer is in part greatly influenced by the presence of oxygen and the early irreversible changes produced thereby. The combined use of a hydrosulfite with ascorbic acid greatly reduces any such tendency.

I have also found that it is possible to prepare a substantially dry composition comprising a hydrosulfite and a salt of an ascorbic acid to produce a convenient and unexpectedly stable composition for use in the treatment of beer. This is of industrial importance. The sodium salt of ascorbic acid is one of the preferred forms but other neutral metal or alkali metal salts may be used. Neutral metal salts of acids containing the ene-diol group may also be employed with sodium hydrosulfite or with other salts of hydrosulphurous acid, particularly the alkali metal salts, all of which are intended to be included in the term "hydrosulfite compound."

Such a mixture comprising sodium hydrosulfite and the sodium salt of ascorbic acid may be added to beer or a malt beverage, preferably after fermentation, before or during the tank storage of such or at any convenient point thereafter but prior to capping after the filling operation.

The following examples will serve to illustrate the practice of this invention without limiting the scope of the claims:

Example 1

A mixture comprising 31% sodium hydrosulfite and 69% sodium ascorbate is prepared. This mixture is added to storage beer at the rate of 15 milligrams per 12 ounce bottle as follows: 2.3 pounds of the sodium hydrosulfite-sodium ascorbate mixture is dissolved in about two or three gallons of water. This solution is thrown through the manhole of a 200 barrel storage tank. The manhole is closed and the beer from the fermenter is pumped into the tank. The rapid movement of the beer entering the tank causes complete mixing of the solution with the beer. When the tank is full, the beer supply is shut off and the tank is allowed to stand until the beer is ready for its prefiltration, the next step in normal processing. All subsequent steps are those encountered in the normal brewing process, and no change is necessary from those steps now customarily used for the processing of beer. The chill-proofing agent normally added to beer may be added along with the reducing materials or at some step prior or subsequent to their use.

Example 2

A mixture of 45% sodium hydrosulfite and 55% sodium ascorbate is prepared. 3.1 pounds of this mixture are dissolved in about 3 gallons of beer. This mixture is transferred into the reservoir of a proportioning pump connected to the beer lines entering the storage tank of 200 barrel capacity. Beer containing chillproofing agent in the ruh tank is passed through a filter and from the filter enters the storage tank. While the beer is flowing into the storage tank, the proportioning pump injects the concentrated reducing solution into the line at a rate such that the reducing substances will be completely added by the time the 200 barrel storage tank is full. The amount of the stabilizing mixture added is equivalent to 10 milligrams of sodium hydrosulfite and 10 milligrams of ascorbic acid per 12 ounce bottle. When the tank is completely full, the beer flow is turned off and the tank is allowed to stand for the storage period for maturing the beer. The subsequent processing of this beer is the same as now ordinarily encountered in the normal operation of the brewery.

Example 3

A mixture of 60% sodium hydrosulfite and 40% sodium isoascorbate is prepared. 4½ pounds of this mixture are dissolved in about four gallons of beer. This concentrated solution is placed in a 300 barrel tank and the beer from the fermenters is started flowing into the tank. The rapid motion of the entering beer causes complete mixing with the concentrated solution. When 300 barrels of beer have entered the tank and the tank is full, the flow is shut off. Subsequent processing of this beer is the same as is the usual practice. The amount of reducing material added is equivalent to 12.5 milligrams of sodium hydrosulfite and 7.5 milligrams of ascorbic acid per 12 ounce bottle.

Example 4

A mixture is prepared containing 20% sodium hydrosulfite and 80% of sodium isoascorbate. 5 pounds of this mixture is dissolved in about 5 gallons of water. This solution is placed in a small tank and connected with a proportioning pump. The outlet of the proportioning pump is connected to the beer line transferring beer from the fermenters to the storage tanks. The rate of flow of the proportioning pump is adjusted so that the five gallons of solution will be proportioned into 500 barrels of beer entering the storage tanks. The beer is held in these tanks for the normal period of storage and then it is subsequently chillproofed and processed in the usual manner. The introduction of this solution does not necessitate any other change in the usual routine processing of the beer.

Example 5

A mixture comprising 25% sodium hydrosulfite and 75% calcium ascorbate is prepared. 12½ pounds of this mixture is dissolved in about 15 gallons of water. This solution is placed in a closed vessel connected to a proportioning pump. It is proportioned into beer entering storage tanks. The rate of addition is adjusted so that the total volume of concentrated solution would treat 1000 barrels of beer. This beer is treated in the normal fashion with chillproofing, prefiltration, carbonation or other processing normal to the operation of the brewery.

The above examples are given for the purpose of illustrating the practice of this invention. The invention should not be considered as limited to the preparations and amounts of materials used therein. Many variations may be made, both in the levels of treatment and in the ratios of hydrosulfite and ascorbate employed, without departing from the scope of the appended claims.

I claim:

1. Compositions for the preparation of stable solutions for the treatment of malt beverages comprising a salt of hydrosulphurous acid and a salt of an ascorbic acid.

2. Compositions for the preparation of stable solutions for the treatment of malt beverages comprising a salt of hydrosulphurous acid and a salt of anascorbic acid, said salt of hydrosulphurous acid comprising between 5% and 90% of the mixture.

3. Compositions for the preparation of stable solutions for the treatment of malt beverages comprising sodium hydrosulfite and sodium isoascorbate.

4. Compositions for the preparation of stable solutions for the treatment of malt beverages comprising sodium hydrosulfite and sodium ascorbate.

5. A stable solution for the treatment of malt beverages to protect said malt beverages from the deleterious effects of air and oxidation comprising a salt of hydrosulphurous acid and a salt of an ascorbic acid dissolved in an aqueous medium.

6. A stable solution for the treatment of malt beverages to protect said malt beverages from the deleterious effects of air and oxidation comprising a salt of hydrosulphurous acid and a salt of an ascorbic acid dissolved in beer.

7. A stable solution for the treatment of malt beverages to protect said malt beverages from the deleterious effects of air and oxidation comprising sodium hydrosulfite and sodium isoascorbate dissolved in an aqueous medium.

8. A stable solution for the treatment of malt beverages to protect said malt beverages from the deleterious effects of air and oxidation comprising sodium hydrosulfite and sodium isoascorbate dissolved in beer.

9. A stable solution for the treatment of malt beverages to protect said malt beverages from the deleterious effects of air and oxidation comprising sodium hydrosulfite and sodium ascorbate dissolved in an aqueous medium.

10. A stable solution for the treatment of malt beverages to protect said malt beverages from the deleterious effects of air and oxidation comprising sodium hydrosulfite and sodium ascorbate dissolved in beer.

11. A method of treating malt beverages to protect such beverages from the deleterious effects of oxidation which comprises adding to a malt beverage subsequent to fermentation an aqueous solution of a salt hydrosulphurous acid and a salt of an ascorbic acid.

12. A method of treating mealt beverages to protect such beverages from the deleterious effects of oxidation which comprises adding to a malt beverage subsequent to fermentation a solution in beer of a salt of hydrosulphurous acid and a salt of an ascorbic acid.

13. A method of treating malt beverages to protect such beverages from the deleterious effects of oxidation which comprises adding to a malt beverage subsequent to fermentation an aqueous solution of sodium hydrosulfite and sodium isoascorbate.

14. A method of treating malt beverages to protect such beverages from the deleterious effects of oxidation which comprises adding to a malt beverage subsequent to fermentation a solution in beer of sodium hydrosulfite and sodium isoascorbate.

15. A method of treating malt beverages to protect such beverages which comprises adding to a malt beverage subsequent to fermentation an aqueous solution of sodium hydrosulfite and sodium ascorbate.

16. A method of treating malt beverages to protect such beverages from the deleterious effects of oxidation which comprises adding to a malt beverage subsequent to fermentation a solution in beer of sodium hydrosulfite and sodium ascorbate.

References Cited in the file of this patent

UNITED STATES PATENTS

| | | |
|---|---|---|
| 2,159,985 | Gray et al. | May 20, 1939 |
| 2,206,066 | Wallerstein | July 2, 1940 |
| 2,620,275 | Gray | Dec. 2, 1952 |
| 2,788,281 | Guadagni | Apr. 9, 1957 |